United States Patent [19]

Roe et al.

[11] Patent Number: 4,946,206
[45] Date of Patent: Aug. 7, 1990

[54] BIDIRECTIONAL CORRUGATED PIPE-RIB SEAL

[75] Inventors: Stephen L. Roe, Willmar; Eldon G. Bonnema, Prinsburg; John L. Seehausen, Morton, all of Minn.

[73] Assignee: Prinsco, Inc., Prinsburg, Minn.

[21] Appl. No.: 315,718

[22] Filed: Feb. 27, 1989

[51] Int. Cl.$^5$ ............................................. F16L 17/02
[52] U.S. Cl. .................................. 285/369; 285/345; 285/903; 285/910
[58] Field of Search ............... 285/903, 910, 364, 345, 285/230, 231, 369; 277/209, 211, 213 207 R

[56] References Cited

U.S. PATENT DOCUMENTS

| | | | |
|---|---|---|---|
| 220,461 | 10/1879 | Eaton | 265/910 X |
| 1,883,609 | 5/1930 | Dennis | 277/207 |
| 2,662,464 | 12/1953 | Weeks | 285/140 X |
| 3,163,432 | 12/1964 | De Boer | 277/209 |
| 3,510,140 | 5/1967 | Hermann | 277/205 |
| 3,796,447 | 3/1974 | Putter | 285/235 |
| 3,857,589 | 12/1974 | Oostenbrink | 277/209 X |
| 3,890,584 | 6/1975 | Spinner | 285/910 X |
| 4,124,236 | 11/1978 | Guidry | 285/373 |
| 4,202,568 | 5/1980 | Strom | 285/336 |
| 4,625,998 | 12/1986 | Draudt et al. | 285/7 |
| 4,702,502 | 10/1987 | Shade et al. | 285/231 |

FOREIGN PATENT DOCUMENTS

| | | | |
|---|---|---|---|
| 3605330 | 8/1987 | Fed. Rep. of Germany | 285/903 |
| 1227402 | 8/1960 | France | 277/211 |

OTHER PUBLICATIONS

Armco SMOOTH-COR B & C Telephone Duct advertisement.
Armco SMOOTH-COR B & C Telecommunications Duct advertisement.

*Primary Examiner*—Dave W. Arola
*Attorney, Agent, or Firm*—Schroeder & Siegfried

[57] ABSTRACT

A sealing ring made of an elastomeric readily flowable incompressible material utilized for perfecting a seal between the interior surface of a coupling sleeve and the crest of a rib of a section of corrugated plastic pipe, the sealing ring having a generally flat annular body which in its free form has its major cross-sectional series of axially extending ribs, one of which is located on the inner diametrical surface of the ring for securing the ring within the valley between adjacent ribs on the corrugated pipe, a second rib located on the outer circumferential surface of the ring for primarily sealing between the coupling sleeve and the proximal area of the crest of a rib of the corrugated pipe against infiltration of external fluids and solids, and an intermediate rib for primarily sealing between the coupling sleeve and the distal area of the crest of a rib of the corrugated pipe against the escape of fluids and solids flowing therethrough.

28 Claims, 1 Drawing Sheet

BIDIRECTIONAL CORRUGATED PIPE-RIB SEAL

BACKGROUND OF THE INVENTION

The present invention relates to elastomeric flowable gaskets for use with corrugated pipe, and more particularly relates to elastomeric flowable gaskets for sealing the joint between a pair of telescopically engaged sections of corrugated pipe, or sealing the joint between a section of corrugated pipe and a coupling sleeve extending thereover.

In recent years, corrugated plastic tubing has become increasingly popular for use in underground water and sewer drainage systems, particularly plastic corrugated tubing having a large diameter. Such tubing must not only be strong to resist the pressure of the soil surrounding the pipe, but it must also be tightly sealed to prevent soil and other liquids, such as water, from infiltrating the system, and to prevent the sewage or other fluid flowing within the sections of pipe from escaping into the surrounding soil.

In the past, other gaskets and coupling methods have been utilized which have proved to be ineffective, time consuming to assemble and implement, and costly to manufacture. Examples of such prior art are shown in U.S. Pat. No. 4,702,502, issued to Shade et al on Oct. 27, 1987; and U.S. Pat. No. 4,202,568, issued to Strom on May 13, 1980.

In Shade et al '502, a gasket is shown which utilizes relatively thick protrusions that extend substantially into the valleys between adjacent ribs on a piece of corrugated tubing, and are designed to completely fill such valleys and consequently seal between the corrugated tubing and a sleeve extending thereover. One such rib is designated as an anchoring rib and the others perform a sealing function. Consequently, each rib is equally spaced from the adjacent rib in order to individually occupy separate successive valleys of the corrugated tubing. Moreover, the gasket shown in Shade et al '502 must necessarily have a cross-sectional radial dimension which is at least equal to the axial dimensions of one pipe-rib and two (2) valleys of a section of corrugated tubing. Such restrictions in the design thereof require large amounts of material to manufacture same.

As mentioned above, such a gasket as described in Shade et al '502 requires an amount of material sufficient to fill at least two valleys between adjacent ribs of a section of corrugated tubing. With the increasing popularity of the use of corrugated tubing for water and sewer drainage systems, such a gasket as described immediately above has proven to be cost prohibitive due to the large expense for materials. Particularly with the use of large diameter corrugated tubing (usually 8" in diameter or larger), the volume of space occupied by the valleys between adjacent ribs on a section of corrugated pipe becomes large, and consequently the cost of material for producing such a gasket becomes prohibitive.

Similarly, as shown in Strom '568, others in the past have attempted to seal the joint between adjoining sections of corrugated tubing by providing a gasket to overlap the joint, and tightening the seal over the joint through the use of a locking ring. The locking ring securely connects the adjacent sections of corrugated tubing together. Again, the gasket utilized for such a coupling apparatus must be relatively thick and have larger dimensions to cover the joint between adjoining sections of corrugated tubing, thereby increasing the cost of manufacture of same. Moreover, a locking ring must be provided to hold the seal and sections of corrugated tubing securely in place, thereby further increasing the cost of manufacture of same. The assembly of such a sealing system is extremely time consuming and difficult to implement.

The increasing popularity for using corrugated tubing (particularly tubing having a large diameter) for underground water and sewer systems has brought about a strong desire and need in the associated industry for an efficient and cost effective means for sealing such corrugated tubing from external infiltration of soil and liquid, and from the escape of fluids and solids flowing therethrough. The present invention utilizes a minimal amount of incompressible elastomeric flowable material to provide a bidirectional corrugated pipe-rib seal which is markedly less expensive to produce and is unique in its application and structure.

The present invention is designed and constructed to seal against infiltration or the escape of fluids and solids from the corrugated tubing by sealing the joints between the proximal and distal areas of the crest of a rib of a piece of corrugated tubing and the sleeve which extends thereover. By so doing, there is no need to fill the entire volume of the valleys between adjacent ribs of a section of corrugated tubing. Consequently, much less material is used and the cost to manufacture same is markedly reduced.

BRIEF SUMMARY OF THE INVENTION

The present invention is comprised of a relatively flat annular gasket or sealing ring which is made of a relatively incompressible flowable elastomeric material, and which is utilized to seal the joint between the inner surface of a coupling sleeve and the crest of a rib of corrugated plastic tubing which is telescopically inserted therein.

The gasket, in its free form, has an interior diameter which is slightly less than the diameter of a valley between a pair of adjacent ribs of the section of corrugated pipe upon which the gasket is fitted. The outer circumferential diameter of the gasket, in its free form, approximates the outer diameter of a rib of a section of corrugated pipe upon which it is to be fitted.

The inner diametrical surface and the outer circumferential edge of the gasket are characterized by axially extending annular protrusions or ribs. Intermediate to such inner and outer ribs on the gasket is an intermediate axially extending annular protrusion or rib which is arranged concentrically between the outer circumferential and inner diametrical ribs of the gasket. The axial dimensions of each of such ribs is greater then the axial dimensions of the portions of the gasket body disposed therebetween. The intermediate rib is spaced unequally between the inner and outer gasket ribs, and the spacing between the intermediate and outer ribs approximates the distance between the distal and proximal portions of the crest of a rib on a section of corrugated pipe upon which the gasket is to be fitted.

Once the gasket is fitted onto a section of corrugated tubing, the inner diametrical surface of the gasket rests snugly in a valley between a pair of adjacent ribs of the corrugated tubing. Because the inner diametrical surface of the gasket, in its free form, is slightly less in diameter than the diameter of the valley within which it is disposed, the material of the gasket is caused to stretch outwardly in a radial direction, thereby causing the outer circumferential surface to also expand in diameter. As a result thereof, when the gasket is fitted on a piece of corrugated tubing, the outer circumferential surface of the gasket extends radially outward from the outer diameter of an adjacent rib of the corrugated pipe.

Upon receipt of the coupling sleeve over the associated section of corrugated tubing, the outer circumferential protrusion or rib on the gasket catches on the receiving edges of the coupling sleeve, thereby causing the gasket to slide to a position atop the adjacent rib of the section of corrugated tubing.

The sliding of the gasket to a position atop the adjacent rib of the section of corrugated tubing causes the outer circumferential rib of the gasket to flow into a position seated at the joint between the inner surface of the coupling sleeve and the proximal (more inwardly disposed) portion of the crest of the adjacent rib of the section of corrugated tubing. The intermediate rib of the gasket will consequently be caused to seat at the joint between the inner surface of the coupling sleeve and the distal (more outwardly disposed) portion of the crest of the adjacent rib of the section of corrugated tubing.

Because the outer circumferential rib and the intermediate rib form seals between the inner diametrical surface of the coupling sleeve and the proximal and distal portions of the crest of a pipe rib, respectively, such ribs are hereinafter defined as the outer circumferential sealing rib and the intermediate sealing rib, respectively.

Although the gasket described above may be utilized with corrugated tubing of all diameters, the design of this gasket is particularly useful with corrugated tubing having a large diameter, such as described in U.S. Patent Application Ser. No. 07/120,824, and U.S. Pat. Application Ser. No. 07/201,631, the disclosures of which are incorporated herein by reference thereto. Such large diameter sections of corrugated tubing quite often have deep wide valleys and corresponding wide ribs. Use of conventional sealing devices, as described above, require that the seal be made out of a volume of material which entirely fills at least two of the valleys between adjacent ribs of a section of corrugated pipe in order to anchor and seal the joints between an outer coupling sleeve and the outer diametrical surface of the corrugated tubing. Such a conventional seal is extremely cost prohibitive to manufacture due to the excessive volume of material which is necessary to use such conventional structures. Moreover, such a conventional seal would be extremely bulky and hard to handle and apply to a section of large diameter corrugated tubing.

The present invention, on the other hand, is made from a minimal amount of material necessary to seal the joint between an outer coupling sleeve and the crest of a rib of a section of corrugated tubing. The present invention utilizes only an amount of material which is necessary to seal the particular joints between the proximal and distal portions of a crest of a rib on a section of corrugated tubing and the inner surface of the coupling sleeve which is telescopically extended thereover. The present invention does not use protrusions or ribs which entirely fill the valley between adjacent ribs when a coupling sleeve is extended thereover.

The outer circumferential and intermediate sealing ribs of the gasket described above are designed to seal between the proximal and distal portions, respectively, of the crest of a rib on a section of corrugated tubing and a coupling sleeve which telescopically extends thereover. The ribs of the gasket do not extend a substantial distance into the valleys of the corrugated tubing.

The outer circumferential sealing rib of the gasket primarily protects against the infiltration of external fluids or solids; the intermediate sealing rib primarily functions to prevent the escape of sewage or other fluids passing through the adjoining sections of corrugated tubing; and the internal diametrical protrusion or rib functions primarily to position the gasket in its proper position during assembly thereof upon a section of corrugated tubing. Upon assembly of the coupling sleeve over a section of corrugated tubing, the gasket will slidably engage an adjacent pipe rib and slide into its sealing position atop the adjacent pipe rib, so as to seal between the inner surface of the coupling sleeve and the proximal and distal portions of the crest of the adjacent pipe rib.

BRIEF DESCRIPTION OF THE DRAWINGS

These and other objects and advantages of the invention will more fully appear from the following description, made in connection with the accompanying drawings, wherein like reference characters refer to the same or similar parts throughout the several views, and in which.

DETAILED DESCRIPTION OF THE INVENTION

Figure 1:
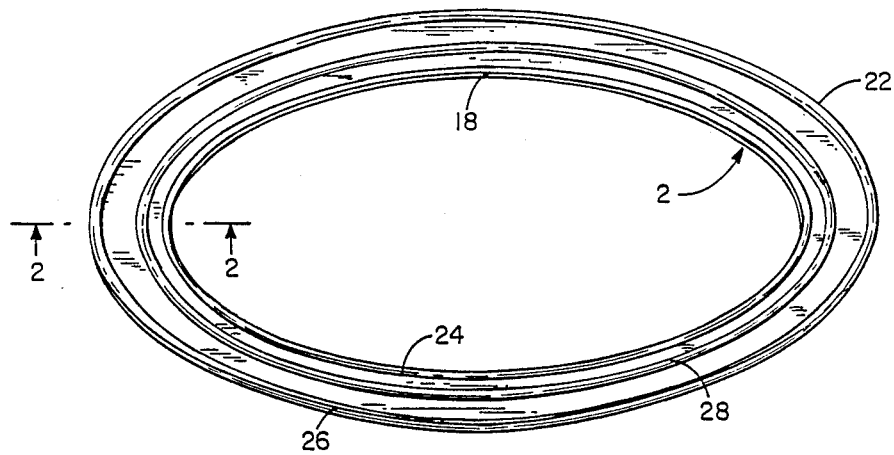
FIG. 1, is a plan view of our gasket for sealing between a section of corrugated pipe and a sleeve extending thereover, said gasket being made in accordance with our invention.

Shown in FIG. 1 is a plan view of our improved sealing ring or gasket 2 which is utilized for sealing between a section of corrugated tubing 4 and an outer sleeve 6 extending thereover. More specifically, our improved gasket 2 is constructed to seal between the interior surface 16 of an outer coupling sleeve 6 and the distal and proximal portions, 8 and 10 respectively, of the crest 12 of a pipe-rib 14 on a section of plastic corrugated tubing 4, when sleeve 6 extends thereover.

Our improved gasket 2 is constructed of a relatively flat annular sealing ring which is made of a relatively incompressible flowable elastomeric material. The amount of material utilized to manufacture our improved gasket is markedly less than the prior art gaskets as discussed hereinabove. The use of a relatively incompressible flowable elastomeric material provides a gasket which readily flows into sealing relation between a section of plastic corrugated tubing 4 and the coupling sleeve 6 which extends thereover.

Our improved gasket 2, in its free form, has an interior diametrical surface 18, the diameter of which is generally slightly less than the exterior diameter of a section of corrugated tubing 4, taken at the bottom of a valley 20 thereof. The outer circumferential surface 22 of our improved gasket 2 has a diameter approximating the outer diameter of a section of corrugated tubing 4, taken along the crest 12 of a pipe-rib 14 thereon. For example, a section of corrugated tubing 4 having an exterior pipe-rib diameter of approximately 14 ¼ inches, and a valley diameter of approximately 12 inches, may be used with one form of our gasket having an exterior diameter of approximately 14 ⅜ inches, with an interior diameter of approximately 10 ⅞ inches. It will be understood, however, that such dimensions of our improved gasket 2 may vary slightly without greatly affecting the function thereof, and may also vary depending upon the relative dimensions of the section of corrugated tubing 4 upon which our improved gasket 2 is to be fitted.

Figure 2:
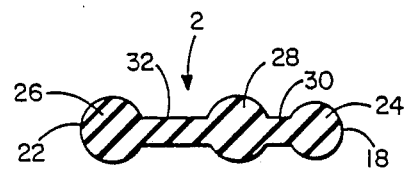
FIG. 2, is a cross-sectional view of the gasket shown in FIG. 1, taken along line 2—2, showing the relative axial and radial configuration of our improved gasket.
Figure 3:
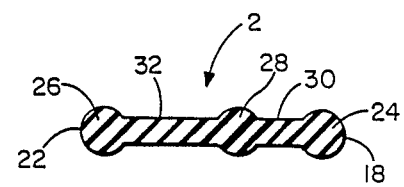
FIG. 3, is a cross-sectional view of an alternative embodiment of our improved gasket.

Our improved gasket 2, in its free form, has a preferred cross-sectional configuration as shown in FIG. 2. An alternative embodiment for our improved gasket 2 is shown in FIG. 3. Located at the inner diametrical surface 18 and the outer circumferential surface 22 of the gasket 2 are axially extending annular protrusions or ribs, 24 and 26 respectively. Located intermediate to the inner diametrical rib 24 and the outer circumferential rib 26, and concentric therewith, is an intermediate axially extending annular protrusion or rib 28. Extending radially between the inner diametrical rib 24 and the intermediate rib 28 is a generally flat web portion 30. A second generally flat web portion 32 extends between the intermediate annular rib 28 and the outer circumferential annular rib 26.

As can be seen in FIG. 2, the annular ribs 24, 26 and 28 are unequally spaced along a radial axis extending therethrough (horizontal axis in FIG. 2 and FIG. 3), and consequently web portion 30 generally has shorter radial dimensions than web portion 32. Preferably, the radial dimension of web portion 30 is approximately one-fourth to one-third the radial dimension of web portion 32.

Each annular rib 24, 26 and 28 has a circular cross-sectional shape, and each has axial dimensions (vertical dimensions, as shown in FIG. 2 and FIG. 3) greater than the axial dimensions of the web portion 30 or 32. Preferably, ribs 24, 26 and 28 are constructed with axial dimensions which are approximately 1.5 to 3.0 times greater than the axial dimensions of at least web portion 32, but may vary depending on the size of the corrugated pipe upon which the gasket 2 is fitted, or the particular application for which the gasket is used.

In the preferred embodiment, as shown in FIG. 2, the outer circumferential rib 26 and the intermediate annular rib 28 have slightly greater axial dimensions, and consequently slightly greater diameters, than the interior diametrical annular rib 24. It has been found that with gasket 2 having an outer diameter of approximately 14 ⅜ inches, and an interior diameter approximately of 10 ⅞ inches, the axial dimensions of the outer circumferential rib 26 and the intermediate annular rib 28 should preferably approximate 7/16 inch in diameter. The interior diametrical rib 24 preferably approximates ⅜ inch in diameter, and the web portions 30 and 32 extending therebetween preferably approximate 3/16 inch in thickness.

In the alternative embodiment shown in FIG. 3, all annular ribs 24, 26 and 28 have equal diameters, which may vary depending upon the size of the corrugated pipe with which gasket 2 is to be used. However, unlike the prior art gaskets, the annular ribs 24, 26 and 28 of our improved gasket 2 do not occupy a substantial portion of the volume of the valley 20 within which they extend (see FIGS. 4 and 5). Preferably, such ribs will occupy less than one-half of the volume of the valley 20 within which they extend.

It can also be seen from the preferred embodiment in FIG. 2 and from the alternative embodiment in FIG. 3, that the cross-sectional radial dimensions of the portion of gasket 2 extending from the interior diametrical surface 18 through the intermediate annular rib 28 is within approximately one-half (one-half or less) the cross-sectional radial dimension of the entire gasket. Moreover, the radial dimension from the center of the interior diametrical rib 24 to the center of the intermediate annular rib 28 is less than ½ the distance between the center of the inner diametrical rib 24 and the center of the circumferential rib 26.

Figures 4, 5:
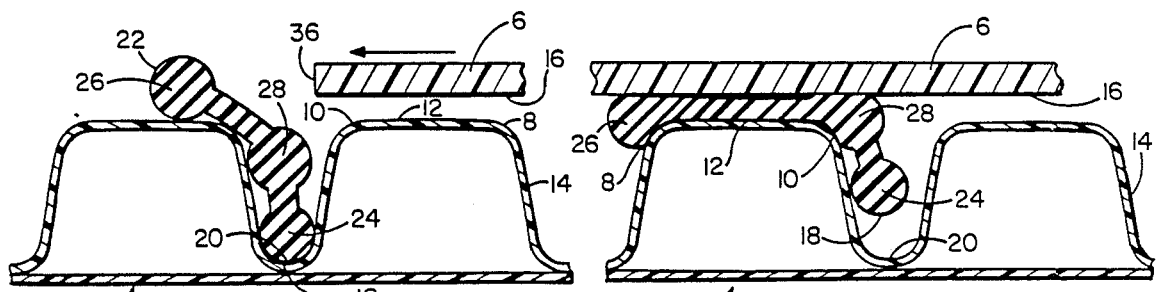
FIG. 4, is a cross-sectional view, taken longitudinally, of a section of corrugated plastic tubing having our improved gasket mounted thereon, and showing the relative positioning thereof prior to receiving a coupling sleeve thereover.
FIG. 5, is a cross-sectional view, taken longitudinally, of the corrugated plastic tubing shown in FIG. 4 with a coupling sleeve extending thereover, and showing our improved gasket in its assembled sealed position.

As best shown in FIG. 4, the inner diametrical rib 24 functions to initially locate or position the interior diametrical surface 18 of the gasket within a valley 20 of a section of corrugated tubing 4. The inner diametrical locating rib 24 initially seats near the bottom of valley 20, so that the remaining portions of the body of the gasket 2 lay against the side portion 34 and the proximal portion 10 of crest 12 of pipe-rib 14.

The outer circumferential rib 26 and the intermediate annular rib 28 create seals between the distal portion 8 and proximal portion 10, respectively, of a pipe-rib 14, and the coupling sleeve 6 which extends thereover. The outer circumferential sealing rib 26 functions further to catch on the receiving portions 36 of the coupling sleeve 6 to cause gasket 2 to slide into its sealing position atop pipe-rib 14.

The radial distance between the intermediate sealing rib 28 and the outer circumferential sealing rib 26, and consequently the length of web portion 32, is determined primarily by the distance between the distal portion 8 and proximal portion 10 of the crest 12 of a pipe-rib 14 on the section of corrugated pipe 4 upon which our improved gasket 2 is to be fitted. The distance between the intermediate sealing rib 28 and the outer circumferential sealing rib 26 is approximately equal to the distance between the distal portion 8 and the proximal portion 10 of the crest 12 of the pipe-rib 14 with which gasket 2 is intended to be used.

The term "approximately," as used herein for describing the distance between the intermediate sealing rib 28 and the circumferential sealing rib 26, and consequently the length of web portion 32, is defined to indicate that tolerances are necessarily taken into consideration to accommodate for the stretching and flowing of the gasket material when an outer coupling sleeve 6 is extended thereover, and the resulting radial dimensions between the intermediate sealing rib 28 and the outer circumferential sealing rib 26 are such that, when coupling sleeve 6 is extended thereover, as shown in FIG. 5, the outer circumferential sealing rib 26 seals between the distal portion 8 of the crest 12 of pipe-rib 14 and the interior surface 16 of the coupling sleeve 6; and the intermediate sealing rib 28 seals between the proximal portion 10 of the crest 12 of pipe-rib 14 and the interior surface 16 of the coupling sleeve 6.

As can best be seen in FIGS. 4 and 5, the relative sizes of the sealing ribs 26 and 28 are only large enough to seal the necessary joints between the distal and proximal portions, 8 and 10, of the crest 12 of the pipe-rib 14, and the interior surface 16 of a coupling sleeve 6. As a consequence thereof, our improved gasket 2 requires much less material for manufacturing same.

The reduction of the material used also reduces the overall size of the gasket, and consequently the radial dimensions of the gasket are markedly reduced. As can be seen in FIG. 4, the total radial dimensions of the gasket body, in its free form, approximate, or are less than, the axial dimensions of one adjacent pipe-rib 14 and valley 20 of a section of corrugated tubing 4. Unlike the prior art, which utilizes a volume of material to fill at least two valleys 20 of a section of corrugated tubing 4, our improved gasket 2 utilizes much less space. As mentioned above, each sealing rib 26 and 28 of our improved gasket 2 preferably utilize less than one-half the volume of one valley 20 of the section of corrugated tubing 4 upon which the gasket 2 is fitted. As a result thereof, the sealing ribs 26 and 28 extend only a small distance into the valleys 20 when gasket 2 is seated in its sealing position atop crest 12 of a pipe-rib 14 on a section of corrugated tubing 4.

As a further consequence of the reduced amount of material required for manufacturing our improved gasket 2, it can be seen in FIGS. 4 and 5 that the interior diametrical locating rib 24 seats within the same valley 20 as the intermediate sealing rib 28. Contrary to prior art gaskets, it is not necessary for the locating rib 24 to extend into a separate valley, since the amount of material used to produce the intermediate sealing rib 28 occupies only a minimal amount of the volume of space provided by valley 20. Thus, the radial dimensions of gasket 2, as a whole, are markedly reduced, thereby further reducing the cost to manufacture same.

As shown in FIG. 4, in using our improved gasket 2, the gasket is first fitted onto a section of corrugated tubing 4 with the inner locating rib 24 seated within a valley 20 between a pair of adjacent pipe-ribs 14. Because the inner diametrical dimension of gasket 2 is slightly less than the exterior valley diameter of a section of corrugated tubing 4 upon which the gasket 2 is to be fitted, the gasket 2 is necessarily in a stretched state when applied to the section of corrugated tubing 4.

The stretching or flowing of gasket 2 causes the outer circumferential edge 22, and consequently the outer circumferential sealing rib 26 to expand radially outward. By so doing, the gasket 2 lays over an adjacent pipe-rib 14 so that the circumferential sealing rib 26 rests adjacent to the crest 12 of the pipe-rib 14. Upon insertion of the section of corrugated tubing 4 within an outer coupling sleeve 6, the receiving portions 36 of coupling sleeve 6 catch on the outer circumferential sealing rib 26, and with additional force, causes gasket 2 to slide into its sealing position atop pipe-rib 14, as shown in FIG. 5. Upon sliding the coupling sleeve 6 over the section of corrugated tubing 4 with the gasket 2 disposed therebetween, each sealing rib 26 and 28 are compressed and caused to flow into the joints between the distal and proximal portions, 8 and 10, of the crest 12 of the pipe-rib 14, and the interior surface 16 of the coupling sleeve 6. As such, a tight seal forms at both of the above-mentioned joints.

The seal formed by the outer circumferential sealing rib 26 between the distal portion 8 of the crest 12 of pipe-rib 14 and the interior surface 16 of the outer coupling sleeve 6, primarily functions to seal against infiltration by external water, or other fluids and solids. On the other hand, the intermediate sealing rib 28, which seals between the proximal portion 10 of the crest 12 of a pipe-rib 14 and the internal surface 16 of the outer coupling sleeve 6 primarily functions to seal against the escape of sewage or other fluids and solids flowing through the interior of adjoining sections of corrugated tubing 4. In this sense, our improved gasket functions to provide a bidirectional seal for use in applications with corrugated tubing.

Figure 6:
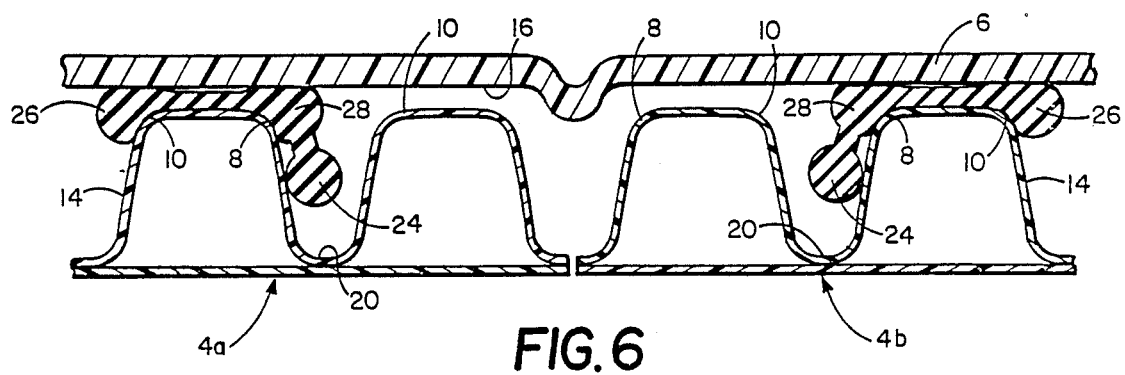
FIG. 6, is a cross-sectional view, taken longitudinally, of a pair of corrugated plastic pipes, the ends of which have been inserted within a coupling sleeve, and showing a pair of our improved gaskets in their assembled sealed positions between the outer coupling sleeve and respective corrugated pipe sections.

The end use of our improved gasket 2 is best shown in FIG. 6, where a pair of adjacent sections of corrugated tubing 4a and 4b are coupled together by use of coupling sleeve 6. As can be seen in FIG. 6, each section of corrugated tubing 4a and 4b has fitted thereon our improved gasket 2. Each gasket 2 is shown in its sealed position between the distal and proximal portions, 8 and 10, of the crest 12 of a pipe-rib 14, and the interior surface 16 of coupling sleeve 6. By utilizing our improved gasket 2 in this manner, such corrugated sections of pipe can effectively and economically be utilized for underground water and sewer drainage systems.

Our improved gasket provides an effective bidirectional seal which prevents infiltration or escape of undesirable fluids or solids. As the demand increases for the use of large diameter corrugated tubing for underground water and sewer systems, the need has developed for a cost effective means of sealing between adjacent sections of pipe. Our improved gasket 2 meets this demand and has proven to be effective for bidirectionally sealing between a section of corrugated pipe 4 and the outer coupling sleeve 6 extending thereover. Our improved gasket 2, because it is unique in its application and structure, is manufactured from a markedly reduced amount of material. As a result thereof, the use of such large diameter corrugated tubing in the manner described above, as well as other sizes of corrugated tubing, can be accomplished in an efficient and cost effective manner.

In considering this invention, it will, of course, be understood that the present disclosure is illustrative only, and that various changes may be made in the form, details, arrangement and proportions of the parts without departing from the scope of the invention, which consists of the matter shown an described herein and set forth in the appended claims.

What is claimed is:

1. A section of corrugated plastic pipeline comprising:
    (a) a section of corrugated plastic pipe having axially spaced annular ribs with circumferentially extending valleys disposed therebetween, each of said ribs having a crest with axially spaced distal and proximal areas;
    (b) a sleeve constructed and arranged to telescopically receive in close-fitting relation said section of pipe therewithin;
    (c) a flat annular body of elastomeric readily flowable incompressible rubber-like material;
    (d) said body in its free form having its major cross-sectional dimensions extending in its radial plane, said radial dimensions of said body being less than the cumulative axial dimension of one said valley and rib of said section of corrugated pipe;

(e) said body having a predetermined annular interior diameter and having its interior diametrical surface constructed and arranged to be received in snug-fitting relation within one of said valleys of said section of corrugated plastic pipe;

(f) said body having an annular circumferential sealing rib defining its circumference, said sealing rib being constructed and arranged to engage and seal against said distal areas of said crest of an adjacent rib of said section of corrugated plastic pipe;

(g) a second annular sealing rib disposed radially inwardly of said circumferential sealing rib and extending concentrically thereof and being constructed and arranged to engage and seal against said proximal areas of said crest of said adjacent rib of said corrugated plastic pipe;

(h) said second sealing rib of said gasket, when the latter is in its free form, being disposed radially inwardly of said circumferential sealing rib a distance approximating the axial dimension between said distal and said proximal areas of said crest of said adjacent rib of said corrugated plastic pipe;

(i) said second sealing rib and said circumferential sealing rib having axial dimensions at least greater than the axial dimensions of the portions of said body disposed therebetween;

(j) said circumferential sealing rib being disposed in sealing relation between the interior surface of said sleeve and said distal areas of said crest of said adjacent rib of said corrugated plastic pipe; and (k) said second sealing rib being disposed in sealing relation between the interior surface of said sleeve and said proximal areas of said crest of said adjacent rib of said corrugated plastic pipe.

2. The structure defined in claim 1, wherein said elastomeric body is constructed and arranged to slidably engage said adjacent rib to slide into its sealing position between said sleeve and said proximal and distal areas of said crest of said corrugated plastic pipe when said sleeve is extended thereover.

3. The structure defined in claim 1 wherein said interior diametrical surface is comprised of an annular rib having axial dimensions at least greater than the cross-sectional axial dimensions of the portion of said body between said second and said circumferential annular sealing ribs.

4. The structure defined in claim 1 wherein the cross-sectional radial dimensions of the portion of said body extending from said interior diametrical surface through said second annular sealing rib is within approximately one-half the cross-sectional radial dimension of the portion of said body extending from said interior diametrical surface through said annular circumferential sealing rib.

5. The structure defined in claim 1 wherein said annular interior diametrical surface is defined by a third annular rib and the radial distance between said second annular sealing rib and said third annular rib approximates one-fourth to one-third of the radial distance between said second annular sealing rib and said circumferential sealing rib.

6. The structure defined in claim 1 wherein the radial distance between said second annular sealing rib and said interior diametrical surface is more than one-third of the radial distance between said second annular sealing rib and said circumferential sealing rib.

7. The structure defined in claim 1, wherein the radial distance between said interior diametrical surface and said second annular sealing rib is less than the distance between said proximal and distal areas of said crest of said rib of said section of corrugated pipe.

8. The structure defined in claim 1, wherein said second and circumferential annular sealing ribs occupy less than one-half of the volume of said valleys into which they extend.

9. The structure defined in claim 1, wherein said interior diametrical surface is disposed within the same said valley as said second annular sealing rib.

10. The structure defined in claim 1, wherein said second annular and circumferential sealing ribs have a circular cross-sectional shape.

11. The structure defined in claim 1, wherein said interior diametrical surface is defined by a third annular rib, said third annular rib having smaller cross-sectional axial dimensions than the cross-sectional axial dimensions of said second annular and said circumferential sealing ribs.

12. A gasket for perfecting a seal between the interior surface of a sleeve and the distal and proximal areas of the crest of a rib of a section of corrugated plastic pipe having successive axially spaced adjacent ribs with valleys therebetween, comprising:

(a) a flat annular body of elastomeric, readily flowable, incompressible rubber-like material;

(b) said body in its free form having its major cross-sectional dimension extending in the radial plane of said body;

(c) said body having a predetermined interior diameter and having an annular locating rib defining its interior diametrical surface;

(d) said body having an annular circumferential sealing rib defining its circumference;

(e) said body having a second annular sealing rib disposed intermediate of said circumferential sealing rib and said locating rib and extending concentrically thereof, said second sealing rib being unequally spaced between said locating rib and said circumferential sealing rib;

(f) said second annular sealing rib and said circumferential sealing rib having axial dimensions which are greater than the cross-sectional axial dimensions of the portion of said body disposed therebetween; and (g) said circumferential sealing rib and said second sealing rib being constructed and arranged to bear and seal against the section of corrugated pipe.

13. The structure defined in claim 12, wherein the cross-sectional radial dimensions of the portion of said body extending from said interior diametrical surface through said second annular sealing rib is within approximately one-half the cross-sectional radial dimension of the portion of said body extending from said interior diametrical surface through said annular circumferential sealing rib.

14. The structure defined in claim 12, wherein the radial distance between said locating rib and said second annular sealing rib approximates one-fourth to one-third of the radial distance between said second annular sealing rib and said circumferential sealing rib.

15. The structure defined in claim 12, wherein the radial distance between said interior diametrical surface and said second annular sealing rib is less than the distance between the proximal and distal areas of the crest of a rib of said section of corrugated pipe.

16. The structure defined in claim 12, wherein said second annular and circumferential sealing ribs have a circular cross-sectional shape.

17. The structure defined in claim 12, wherein the major axial dimensions of said second and circumferential sealing ribs are within the range of 1.5 to 3 times greater than the cross-sectional axial dimensions of the portion of said body disposed therebetween.

18. The structure defined in claim 12, wherein the radial distance between the center of said locating rib and the center of said second annular sealing rib is less than one-half the radial distance between the center of said locating rib and the center of said circumferential sealing rib.

19. The structure defined in claim 12, wherein the radial dimensions of said body are less than the cumulative axial dimensions of one rib and valley of said section of corrugated plastic pipe.

20. The structure defined in claim 12, wherein said second sealing rib of the gasket, when the latter is in its free form, is disposed radially inwardly of said circumferential sealing rib a distance approximating the distance between the proximal and distal areas of the crest of a rib of said section of corrugated pipe.

21. In a device for perfecting a seal between the interior surface of a sleeve and the distal and proximal areas of the crest of a rib of an end section of corrugated plastic pipe having successive axially spaced adjacent ribs and valleys therebetween, the improvement comprising:
   (a) a flat annular body of elastomeric, readily flowable, incompressible rubber-like material;
   (b) said body in its free form having its major cross-sectional dimension extending in its radial plane, said radial dimensions of said body being no greater than the cumulative axial dimensions of one rib and valley of the section of corrugated plastic pipe;
   (c) said body having a predetermined interior diameter and having an annular interior diametrical surface constructed and arranged to be received in snug-fitting relation within the bottom of the valley between two of the adjacent ribs of the end section of the corrugated plastic pipe;
   (d) said body having an annular circumferential sealing rib defining its circumference, said circumferential sealing rib being constructed and arranged to engage and seal against the distal areas of the crest of one of the ribs of the section of corrugated plastic pipe;
   (e) said body having a second annular sealing rib disposed radially inwardly of said circumferential sealing rib and between said interior diametrical surface and said circumferential sealing rib and extending concentrically thereof, and being constructed and arranged to engage and seal against the proximal areas of the crest of such a rib of the section of corrugated plastic pipe when said circumferential sealing rib is in sealing position against the distal areas of the crest of the same rib; and
   (f) said second sealing rib and said circumferential sealing rib having axial dimensions which are at least greater than the axial dimensions of the portion of said body disposed therebetween.

22. The structure defined in claim 21, wherein the cross-sectional radial dimensions of the portion of said body extending from said interior diametrical surface through said second annular sealing rib is within approximately one-half the cross-sectional radial dimension of the portion of said body extending from said interior diametrical surface through said annular circumferential sealing rib.

23. The structure defined in claim 21, wherein the radial distance between said locating rib and said second annular sealing rib approximates one-fourth to one-third of the radial distance between said second annular sealing and said circumferential sealing rib.

24. The structure defined in claim 21, wherein the radial distance between said interior diametrical surface and said second annular sealing rib is less than the distance between the proximal and distal areas of the crest of a rib of a section of corrugated pipe.

25. The structure defined in claim 21, wherein said second annular and circumferential sealing ribs have a circular cross-sectional shape.

26. The structure defined in claim 21, wherein the major axial dimensions of said second and circumferential sealing ribs are within the range of 1.5 to 3 times greater than the cross-sectional axial dimensions of the portion of said body disposed therebetween.

27. The structure defined in claim 21, wherein the radial distance between the center of said locating rib and the center of said second annular sealing rib is approximately one-third the radial distance between the center of said locating rib and the center of said circumferential sealing rib.

28. The structure defined in claim 21, wherein said circumferential and said second sealing rib seal only against the distal and proximal portions, respectively, of the crest of a rib on such a section of corrugated pipe.

* * * * *

UNITED STATES PATENT AND TRADEMARK OFFICE
CERTIFICATE OF CORRECTION

PATENT NO. : 4,946,206
DATED : August 7, 1990
INVENTOR(S) : Stephen L. Roe, Eldon G. Bonnema and John L. Seehausen It is certified that error appears in the above-identified patent and that said Letters Patent is hereby corrected as shown below:

```
In the Abstract, Line 6:  After "cross-sectional",
    insert --dimension extending radially and being
    characterized by a--.
```

Signed and Sealed this

Twenty-eighth Day of January, 1992

Attest:

HARRY F. MANBECK, JR.

*Attesting Officer*    *Commissioner of Patents and Trademarks*